LITHOGRAPHIC PLATES

Filed May 12, 1965 2 Sheets-Sheet 1

INVENTOR
SIMON L. CHU

BY
Curtis, Morris & Safford
ATTORNEYS

Nov. 18, 1969 S. L. CHU 3,479,182

LITHOGRAPHIC PLATES

Filed May 12, 1965 2 Sheets-Sheet 2

INVENTOR
SIMON L. CHU
BY
Curtis, Morris & Safford
ATTORNEYS 3,479,182

LITHOGRAPHIC PLATES

Simon L. Chu, 30 Monroe St., New York, N.Y. 10002

Filed May 12, 1965, Ser. No. 455,073
Int. Cl. G03f *7/08*; G03c *1/54*
U.S. Cl. 96—33 15 Claims

ABSTRACT OF THE DISCLOSURE

Presensitized plates are disclosed which have a bimetallic base, a hardened light or heat-hardenable first coating containing a diazonium compound on said base and a light sensitive second coating containing a diazonium compound on said first coating, said first coating serving as a barrier layer between said bimetallic base and said second coating, which plates can be exposed to light through an image transparency, developed and etched to form bimetallic printing plates.

This invention relates to novel sheet materials useful in photochemical processes such as the preparation of lithographic plates, and particularly sheet materials which comprise a metallic base and a material strongly adherent to said base which material provides a protective boundary layer for overcoats of light-sensitive materials such as various diazo compounds known to the art.

It has been a problem in the art to provide treatments for metallic plates such as those used in dry offset, electrotype, intaglio, printed circuits and especially planographic printing which treatments would both insulate light-sensitive coatings being applied over such plates from chemical reactions with the underlying metal and, at the same time, provide means for achieving a firm bond between the metal and the coating so that after the light-sensitive coating is exposed to light it will be firmly bonded to the metallic base. A number of different treatments of the metal surface have been disclosed in the prior art for the purpose of providing a chemically acceptable and bond-promoting surface. For example, the alkali silicate type treatment disclosed in U.S. Patent 2,714,066 to Jewett et al. is one such treatment. These prior art treatments are helpful under certain conditions, but they leave much to be desired in respect to prevention of a reaction of a reactive metal such as copper with light-sensitive overcoats.

Applicant has discovered a new protective means for the light-sensitive coatings which allows such coatings to be utilized with metal and even copper-surfaced plates in the above-mentioned applications. Plates so prepared have storage lives of many months.

This present advance in the art is of further importance because it provides means for the manufacture of unique bi-metallic plates, particularly for use in lithographic printing, including plates which may be presensitized and/or utilized by exposure to positive transparencies.

The art of lithographic printing depends upon a printing surface having both hydrophilic and hydrophobic areas, the immiscibility of grease and water on said surfaces, and the consequent preferential retention of a greasy image-forming substance by the hydrophobic areas and a similar retention of an oleophobic dampening fluid by the hydrophilic areas.

When a greasy image is printed upon a suitable surface, and the entire surface has been moistened with an aqueous solution, the image areas will repel the water, and the non-image areas will retain the water. Upon subsequent application of greasy printer's ink, the image portions retain the ink, whereas moist non-image areas repel it. The image is then transferred to paper, cloth or other materials to be imprinted by means of an intermedite cylinder, e.g., a so-called offset or blanket cylinder, which is used to prevent mirror image printing.

Where it is desired to obtain a large number of prints from a single lithographic plate, it is often preferable to use bi-metallic plates, that is, plates whose printing surface comprises two metals, usually either copper and aluminum or chromium and copper. Other combinations of metals can be used as economics allow providing only that one metal forms an ink receptive surface and the other metal forms an ink-rejecting surface. Some bi-metallic plates have a third metal forming a base for the two metals which form the printing surfaces. Although such plates are often called tri-metallic plates, only two metals are used on the printing surface.

In a typical bi-metallic plate, the copper surface is ink-receptive and the steel, aluminum, or chrome surface is oleophobic. Thus, the image to be printed with greasy inks is formed on the copper areas.

The choice of metals in such plates is not restricted to those using copper as the image area. Indeed, when treated according to methods known to the art, copper may be made oleophobic and may form non-image areas while a more oleophilic metal surface may form the image area.

Heretofore, there have been a large number of technical problems and inconvenient operations associated with the manufacture, preparation and use of bi-metallic plates. Among the more serious problems are the following:

(1) A large number of manipulative steps must be performed on bi-metallic plates supplied to the print shop before the plates can be used. These steps require considerable time, e.g., in the order of three-quarters of an hour.

(2) A skilled worker is required for preparing these plates for use.

(3) It is necessary to apply, in the printing shop, light sensitive coating on special and relatively expensive equipment designed for the application step.

(4) When the plates are coated with chrome, there is usually the necessity of removing an oxide coating from the chrome with a special cleaning step.

(5) The chrome coated plates, the only multi-metallic lithographic sheets known to the art which may be conveniently used in the preparation of printing surfaces with positive transparencies, are relatively expensive.

It is an object of the present invention to provide a sheet useful for receiving a light-sensitive coating, which sheet is not chemically reactive with said coating. It is a further object of the invention to provide such a sheet having a metallic base.

Another object of the present invention is to provide bi-metallic plates which may be presensitized, i.e., have a light-sensitive coating applied at the place of manufacture rather than in the print shop and thus markedly reduce the time and skill required by the printer for use of the plate.

It is another object of the present invention to provide a barrier layer on lithographic plates and the like which successfully bonds a light-sensitive coating to the metallic surface of an underlying base and further provides a chemically resistant barrier between the metallic layer and the light sensitive coating coated thereover.

A further object is to provide a boundary layer that is effective between copper and a light sensitive diazo.

Still another object of the invention is to provide a bi-metallic lithographic plate which may be conveniently utilized by exposure to positive transparencies and yet does not require expensive chrome coating.

The aforementioned objects are substantially met by the applicant's invention hereinafter described.

This invention provides for the first time a bi-metallic lithographic plate which can be pre-sensitized and which can be used conveniently with a positive transparency although no chrome layer need be used on the plate surface.

It has not heretofore been practical to use reactive metals such as copper as the uppermost metal in preparing multi-metallic plates used for exposure to positive transparencies. A primary problem in utilizing copper in this manner has been the difficulty in providing a barrier layer over the copper that would provide the dual advantage of (1) anchoring a subsequently-applied light-sensitive coating to the metal base and (2) acting as a chemically insulating barrier between the metal and a light-sensitive coating.

However, the applicant has discovered that by utilizing a barrier layer comprising a light-sensitive diazo compound, and by causing that compound to become hardened, a barrier layer can be formed which not only provides a suitable bond between the metallic base and a subsequently applied light-sensitive coating but also provides an effective shield for preventing reactions between the subsequently applied light-sensitive coating and the metallic underlayer. When desirable, the diazo can first be mixed with a soluble film-forming material such as, for example, polyacrylates, polyacrylamides, polyacrylamide copolymers, gum arabic and other acidic gums. The aforementioned copolymers are commercially available, e.g., under the American Cyanamid tradenames Cyanamer A–370, Cyanamer P–250, and Cyanamer P–26 respectively. Polyacrylamides are also available under the American Cyanamid tradenames PAM 50, PAM 75 and PAM 100. Use of these film-formers is particularly advantageous when preparing a tannable colloid coating of the type referred to hereafter.

A particularly advantageous feature of the invention is the discovery of a light-hardenable barrier layer which allows a light sensitive coating to be superimposed on the copper plate without the necessity of interposing another metallic coating such as a chrome or a chrome alloy coating under the light-sensitive coat. The presence of this boundary layer not only allows the omission of chrome, thus saving a great deal of expense, but also allows the presensitizing of the lithographic plate in the manufacturer's plant. Previously, such presensitizing was impossible because (1) diazo coatings do not have sufficient resistance to the severe etching treatment necessary for the removal of the chrome layers on conventional bimetallic plates whereas light-sensitive compounds which had such resistance had too little shelf life, and (2) the adherence to the chrome or copper by the diazo compound is so weak that the diazo compound would be prematurely removed from the plate during the developing step.

In this application, the terms "light-sensitive diazo" and "diazo" are not meant to include only the ordinary light-sensitive diazo compounds known to the art of which the condensation product of paraformaldehyde and p-aminodiphenylamine mentioned in U.S. Patent 3,113,023 to Mellan is a typical example. The present application includes within the scope of the term "diazo" all light-polymerizable materials which derive their light-sensitive characteristics from a diazo component. Thus, it is intended to include within the scope of the term "diazo," the reaction product between certain coupling agents and diazo compounds, as disclosed in U.S. Application Serial No. 307,025 filed September 6, 1963, by Simon Chu, now U.S. Patent No. 3,300,309, and such other diazo reaction products, for example, the reaction product with potassium ferrocyanide disclosed in U.S. Patent 3,113,023.

The term "nitrogen-containing compound" is used to define not only diazo compounds as discussed above, but also azides and other such light-sensitive compounds, and the light or heat hardened products thereof, known to the art.

The invention and the use of the products thereof is best understood by referring to the accompanying drawings.

Figure 1A:
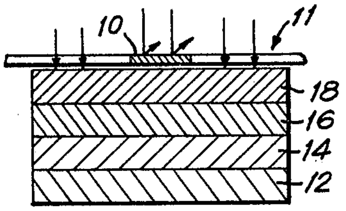
FIGURE 1 is an elevation in section showing a bimetallic presensitized plate for use in the print shop at different stages in its processing after exposure to a positive transparency.
Figure 2A:
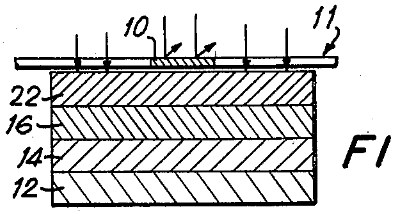
FIGURE 2 shows similar views of another type of bi-metallic presensitized plate at different stages of processing after exposure to a positive transparency.

It is of course to be understood that none of the dimensions of the elements or coatings symbolized in the drawings should be taken as representative of the relative thicknesses of those elements or coatings, the dimensions in the drawings having been chosen for clairty only. In actuality, some examplary dimensions are: For planographic plates an aluminum base is usually from .004 to .010 inch in thickness and a copper coating thereon is about 0.0004 to 0.0005 inch thick. If the copper is .010 to .012 inch thick, the resultant printing element can be used for dry offset printing because it has a desirable amount of relief. Letterpress printing elements can be prepared by utilizing a still thicker copper layer, e.g., a layer of up to about ¼ inch thick. The barrier layer comprised of light-hardened or heat-hardened material and the light-sensitive coating thereon, however, need be no thicker than the minimum thickness necessary to assure a coating substantially free from the holes and other coating defects when the coatings are applied according to procedures known to the art and thin enough to be penetrated by etching solution as is understood in the art.

In order to point out more fully the nature of the present invention, the following specific examples are given as illustrative embodiments of the present invention and products produced thereby.

Figure 1B:
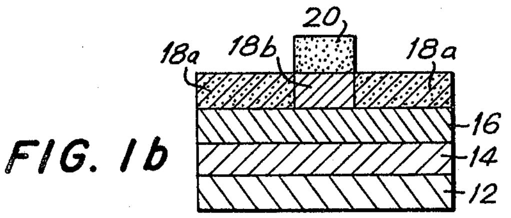
Figure 2B:
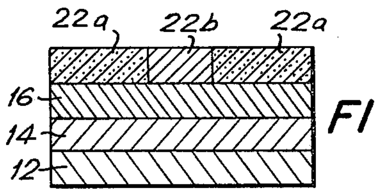
Figure 1C:
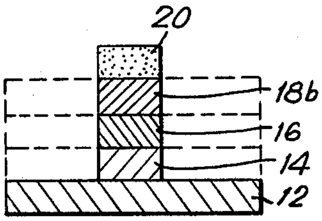
Figure 2C:
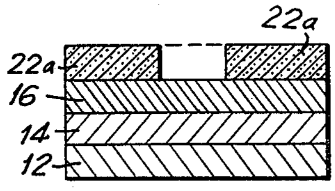
Figure 1D:
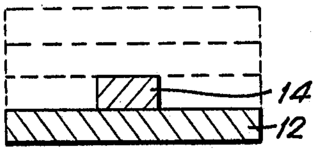
Figure 2D:
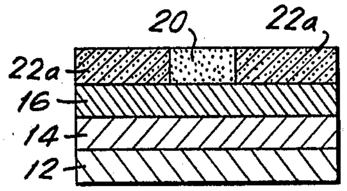
Figure 2E:
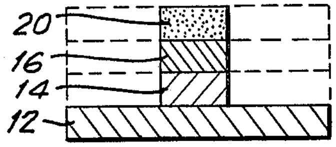

Referring to FIGURE 1*a*, a structure is shown wherein an oleophilic light-hardened barrier layer 16 of a negative-acting diazo resin covers a copper coating 14 over an aluminum base 12. A positive working diazo 18, for example the potassium ferrocyanide-treated diazo described in U.S. Patent 3,113,023, is coated on the hardened barrier layer 16. When the plate so prepared is exposed to actinic light through a positive transparency 11, the image areas, i.e., the areas under the opaque areas 10 of the transparency, are not exposed to light. The non-image areas are exposed and become light-hardened. An alkaline developer, e.g., a solution of 10 grams of the coupling agent beta-naphthol and 120 grams of tetrasodium pyrophosphate in 4000 cc. of water, is then applied to the plate for about 30 seconds and washed off. Referring to FIGURE 1*b*, this alkaline treatment causes non-image areas **18*a* to become desensitized and to form a hydrophilic surface. The image area 18*b* is coupled and becomes hydrophobic. A protective oleophilic, etch-resisting lacquer 20 of the type known to the art is next applied over the hydrophobic areas, i.e., the image areas 18*b* to form a protective stencil or resist. A copper etch solution, for example 47° Baumé ferric nitrate, is then applied to remove the organic material comprising the non-image areas 18*a*, the inert barrier layer 16 and the copper layer 14** lying thereunder. At this point, as shown in FIGURE 1*c*, the plate surface consists of surface areas of two materials: One is the hydrophilic aluminum base plate 12 which has been exposed by the copper etch and which corresponds to non-image areas, i.e, those areas which were exposed to light through the positive transparency, and a second kind of area covered with the oleophilic etch-resistant lacquer 20 which overlays the light-hardened compound. The superficial substance of that latter area may be mechanically or chemically removed to expose the copper layer 14, as shown in FIGURE 1*d*, but that may be unnecessary inasmuch as it will wear off during use on a printing press to reveal an oleophilic and hydrophobic copper image surface.

Lithographic plates and the like prepared in the manner described can be stored for months and then still be ready for immediate use. Storage time can be lengthened, for example by use of the diazo stabilizing methods disclosed in U.S. application Serial No. 307,025 filed September 6, 1963, by Simon Chu, now U.S. Patent No. 3,300,309. Thus, it is now possible to prepare at the point of plate manufacture a presensitized bi-metallic plate conveniently useful in positive-image lithography and analogous applications.

In another embodiment utilizing the invention illustrated in FIGURE 2, a negative-type diazo 16 is coated on copper 14 and exposed to light or heat to form an oleophilic barrier layer. Over that negative diazo is coated a tannable colloid type diazo 22 comprising a diazo and a soluble hydrophilic film-former of the type known in the art. This colloid/diazo combination is a positive acting material. As shown in FIGURE 2*b*, when it is exposed to actinic light through a positive transparency 11, hydrophilic areas **22*a* are formed in areas exposed to the light which areas are to be non-image areas. The image area, which is not exposed to light, is left covered with a non-light-hardened coat 22*b* of poitive diazo 22** that can easily be removed, as shown in FIGURE 2*c*, by water or desensitizing solutions known in the art. Thereafter, an etch resistant oleophilic resinous lacquer 20 is coated over the plate, the lacquer preferentially adhering to the underlying hardened negative diazo 16 which is oleophilic and which is, in fact, the barrier layer. As shown in FIGURES 2*d* and 2*e*, this resinous lacquer 20 forms the stencil which protects the image area during a subsequent copper etching operation, that is, when the copper and unprotected organic material on top of it are etched away, e.g., by 47° Baumé ferric nitrate. After the hardened or taned colloid diazo **22*a*, the barrier layer 16 and the copper 14 are etched away, the surface of the aluminum base 12** is exposed as the working hydrophilic area, i.e., the non-image area as shown in FIGURE 2*e*. The lacquer 20 forming the stencil over the hardened negative diazo 16 may then be removed before the plate is put on to a press or may be allowed to wear off during use in printing as discussed previously.

A negative-working lithographic plate can be prepared according to another embodiment of the invention. FIGURE 3 illustrates such a plate.

Figure 3A:
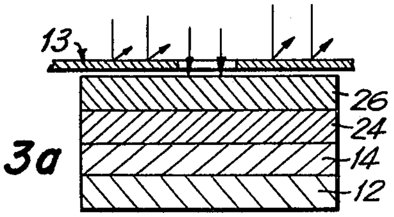
FIGURE 3 shows similar views of the processing steps for a plate of the present invention which is adapted for use for exposure to light through negative transparencies.
Figure 4A:
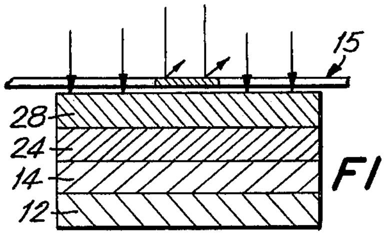
FIGURE 4 shows similar views of the processing steps of still another type of plate formed in accordance with the instant invention.
Figure 3B:
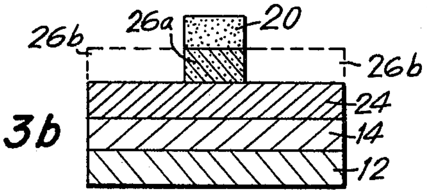
Figure 3C:
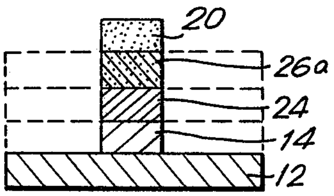
Figure 3D:
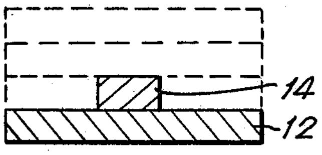
Figure 4D:
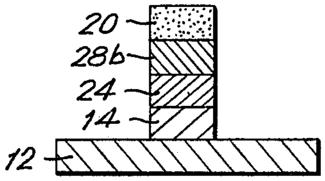

A positive-acting tannable colloid diazo like those known to the art is coated over a copper coated 14 aluminum base 12 and hardened by the application of heat or light to form a hydrophilic barrier layer 24. A negative-working light-sensitive diazo 26 is then coated over barrier layer 24 as shown in FIGURE 3*a*. When the plate thus prepared is exposed to a negative transparency 13, image area **26*a* exposed to the light becomes light-hardened and hydrophobic while the areas 26*b***, not exposed to light, remain in a non-hardened state. The latter are easily removed, as shown in FIGURE 3*b*, by ordinary desensitizing solutions known in the art. Thereafter, an oleophilic resin coating 20 is preferentially placed on the hydrophobic image area **26*a* and elaborate non-image areas 26*b* are etched away with a copper etch to expose the aluminum base 12. If the organic materials 20, 26*a* and 24 are then removed, a bi-metallic plate surface consisting of the oleophobic or hydrophilic aluminum 12** surfaces and the oleophilic or hydrophobic copper surfaces is exposed as shown in FIGURE 3*d*.

Figure 4B:
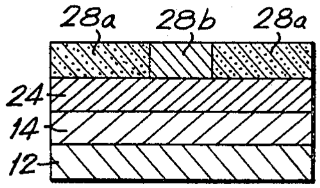
Figure 4C:
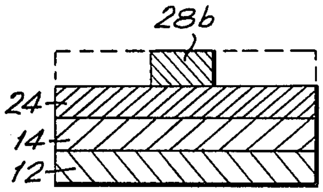

Another plate exemplary of the present invention is shown in FIGURES 4*a* to 4*d*. An aluminum base 12 is electrocoated with copper 14 which is coated with a positive-acting tannable colloid diazo compound 24 of the type previously described. This compound is light hardened to form a hydrophilic barrier layer over which is coated a layer 28 of a positive-acting orthoquinone diazo, e.g., as disclosed in U.S. Patent No. 2,959,482. On exposure to light through a stencil 15, exposed areas **28*a* of the layer 28 are rendered susceptible to dissolution by an aqueous alkali solution. The unexposed or image area 28*b* of layer 28, however, remains hydrophobic and substantially less susceptible to dissolution. Thus, when the alkali solution is applied to remove the areas 28*a*, the hydrophilic, light-hardened barrier layer 24** is exposed as shown in FIGURE 4*c*. Subsequent application of an organophilic lacquer 20 and etching with a copper etch leave the plate in the condition shown by FIGURE 4*d*. As in the other embodiments of the invention, the organic matter overlying the copper 14 may be removed mechanically or allowed to wear off during the printing operation.

It will be apparent in light of the foregoing description that plates can be prepared by directly coating a light-sensitive negative-acting diazo over a metal plate having a hardened negative or positive diazo protective layer.

It is of course to be understood that the foregoing examples are presented to illustrate the invention and that numerous changes can be made in the ingredients, materials and proportions therein without departing from the scope of the invention as defined in the appended claims.

I claim:

1. A presensitized bimetallic planographic printing plate capable, upon exposure to light through an image transparency and development, of providing a planographic surface having an oleophilic image area of one metal and a hydrophilic corresponding non-image area of a second metal which comprises: a first metal base sheet that is hydrophilic in character or capable of being rendered hydrophilic in character by chemical reaction; a second metal base sheet that is, relative to said first metal base sheet, oleophilic in character or capable of being rendered oleophilic in character by chemical reaction, one surface of said second metal base sheet being in intimate surface-to-surface contact relation with said first metal base sheet; a first coatin over said second metal base sheet on the surface thereof opposite said first metal base sheet, said first coating forming an adherent bond with said second metal base sheet and being (A) a hydrophilic light-hardened or heat-hardened product of a positive-acting tannable colloid light-sensitive diazo or (B) an oleophilic light-hardened or heat-hardened product of a negative-acting diazo; a second coating over said first coating forming an adherent bond with the hardened product thereof, said second coating being physically and chemically insulated by said first coating from said second metal base sheet, and said second coating being, when said first coating is the product (A), (C) a positive-acting light-sensitive substantially water-insoluble oleophilic diazo that upon exposure to light is rendered relatively substantially water-soluble or (D) a light-sensitive negative-acting diazo that upon exposure to light is hardened and rendered oleophilic, and when said first coating is the product (B), said second coating being (E) a positive-acting diazo characterized in that it can be coupled to an oleophilic state and further characterized in that it hardens in areas exposed to light which can be desensitized to a hydrophilic state or (F) a tannable colloid of a positive-acting light-sensitive diazo and a water-soluble film-forming resin characterized in that it hardens to a water-insoluble hydrophilic state in areas exposed to light.

2. A positive-acting presensitized bimetallic planographic printing plate capable, upon exposure to light through a positive image transparency and development, of providing a planographic surface having an oleophilic image area of one metal and a hydrophilic corresponding non-image area of a second metal which comprises: a first metal base sheet that is hydrophilic in character or capable of being rendered hydrophilic in character by chemical reaction; a second metal base sheet that is, relative to said first metal base sheet, oleophilic in character or capable of being rendered oleophilic in character by chemical reaction, one surface of said second metal base sheet being in intimate surface-to-surface contact relation with said first metal base sheet; a first coating over said second metal base sheet on the surface thereof opposite said first metal base sheet, said first coating being a hydrophilic light-hardened or heat-hardened product of a positive-acting tannable colloid light-sensitive diazo that forms an adherent bond with said second metal base sheet; a second coating over said first coating forming an adherent bond with the hardened product thereof, said second coating being physically and chemically insulated by said first coating from said second metal base sheet, and said second coating being a positive-acting light-sensitive substantially water-insoluble oleophilic diazo that upon exposure to light is rendered relatively substantially water-soluble.

3. A presensitized bimetallic planographic plate according to claim 2 wherein said second coating is a positive-acting ortho-quinone diazo which upon exposure to light is rendered soluble in aqueous alkali solution.

4. A presensitized bimetallic planographic plate according to claim 2 wherein said second coating is a positive-acting diazo that can be coupled with beta-naphthol to desensitize and render it oleophilic, and that upon exposure to light can be desensitized with an alkaline solution of tetrasodium pyrophosphate to a hydrophilic state.

5. A positive-acting presensitized bimetallic planographic printing plate capable, upon exposure to light through a positive image transparency and development, of providing a planographic surface having an oleophilic image area of one metal and a hydrophilic corresponding non-image area of a second metal which comprises: a first metal base sheet that is hydrophilic in character or capable of being rendered hydrophilic in character by chemical reaction; a second metal base sheet that is, relative to said metal base sheet, oleophilic in character or capable of being rendered olephilic in character by chemical reaction, one surface of said second metal base sheet being in intimate surface-to-surface contact relation with said first metal base sheet; a first coating over said second metal base sheet on the surface thereof opposite said first metal base sheet, said first coating being an oleophilic light-hardened or heat-hardened product of a negative-acting diazo that forms an adherent bond with said second metal base sheet; a second coating over said first coating forming an adherent bond with the hardened product thereof, said second coating being physically and chemically insulated by said first coating from said second metal base sheet, and said second coating being (1) a positive-acting diazo characterized in that it can be coupled to an oleophilic state and further characterized in that it hardens in areas exposed to light which can be desensitized to a hydrophilic state, or (2) a tannable colloid of a positive-acting light-sensitive diazo and a water-soluble film-forming resin characterized in that it hardens to a water-soluble hydrophilic state in areas exposed to light.

6. A negative-acting presensitized bimetallic planographic printing plate capable, upon exposure to light through a negative image transparency and development, of providing a planographic surface having an oleophilic image area of one metal and a hydrophilic corresponding non-image area of a second metal which comprises: a first metal base sheet that is hydrophilic in character or capable of being rendered hydrophilic in character by chemical reaction; a second metal base sheet that is, relative to said first metal base sheet, oleophilic in character or capable of being rendered oleophilic in character by chemical reaction, one surface of said second metal base sheet being in intimate surface-to-surface contact relation with said first metal base sheet; a first coating over said second metal base sheet on the surface thereof opposite said first metal base sheet, said first coating being a hydrophilic light-hardened or heat-hardened product of a positive-acting tannable colloid light-sensitive diazo that forms an adherent bond with said second metal base sheet; a second coating over said first coating forming an adherent bond with the hardened product thereof, said second coating being physically and chemically insulated by said first coating from said second metal base sheet, and said second coating being a light-sensitive negative-acting diazo that upon exposure to light is hardened and rendered oleophilic.

7. A method of making a bimetallic planographic printing plate having a planographic printing surface of an oleophilic image area of one metal and a hydrophilic corresponding non-image area of another metal which comprises:

coating a bimetallic base sheet having a first metal base sheet of a hydrophilic character or capable of being rendered hydrophilic by chemical reaction and a second metal base sheet of, relative to said first metal base sheet, an oleophilic character or capable of being rendered oleophilic by chemical reaction, said first and second metal base sheets being in intimate surface-to-surface contact relation, with a first coat on said second metal base sheet of a light-hardenable or heat-hardenable
- (A) positive-acting tannable colloid light-sensitive diazo that upon hardening forms a hydrophilic product adherently bonded to said second metal base sheet surface or
- (B) a negative-acting light-sensitive diazo that upon hardening forms an oleophilic product adherently bonded to said second metal base sheet surface;

hardening said first coat to desensitize and adherently bond it to said second metal base sheet surface;

coating said hardened first coat (A) with a second coat of
- (C) a positive-acting light-sensitive substantially water-soluble oleophilic diazo that upon exposure to light is rendered relatively water-soluble or
- (D) a light-sensitive negative-acting diazo that upon exposure to light is hardened to an oleophilic state, or coating said hardened first coat (B) with a second coat of
- (E) a positive-acting diazo that can be coupled to an oleophilic state and that upon exposure to light can be desensitized to a hydrophilic state or
- (F) a tannable colloid of a positive-acting light-sensitive diazo and a water-soluble film-forming resin that upon exposure to light is hardened to a water-soluble hydrophilic state, said second coat forming an adherent bond to said first coat and being physically and chemically insulated thereby from said second metal base sheet to form a sensitized plate;

exposing said sensitized plate having said second coat (C), (E) or (F) to light through a positive image transparency or exposing said sensitized plate having said second coat (D) to light through a negative image transparency;

developing said exposed sensitized plate
first by (1) removing from said second coat (C) the light-exposed non-image area with an aqueous desensitizing solution, (2) removing from said second coat (D) the light-unexposed non-image area with an aqueous desensitizing solution, (3) desensitizing on said second coat (E) the light-exposed non-image area with an aqueous desensitizing solution and coupling the light-unexposed image area with a coupling agent for said diazo (E), or (4) removing from said second coat (F) the light-unexposed image area with an aqueous desensitizing solution, second by coating the image area of said second coat (C), (D) or (E), or by filling the image area of said second coat (F), with an etch-resistant oleophilic lacquer, third by removing with an etching solution the non-image area of said second coat (E) or (F), the non-image area of said first coat (A) or (B) and the non-image area of said second metal base sheet thereunder to expose said first metal base sheet in the non-image area, and then by removing from the image area of the oleophilic lacquer, said second coat (C), (D) or (E) and said first coat (A) or (B) to expose said second metal base sheet in the image area.

8. A method of making a bimetallic planographic printing plate according to claim 7 wherein said oleophilic lacquer, said second coat (C), (D) or (E), and said first coat (A) or (B) in the image area are removed mechanically.

9. A method of making a bimetallic planographic printing plate according to claim 7 wherein said oleophilic lacquer, said second coat (C), (D) or (E) and said first coat (A) or (B) in the image area are removed during printing with said plate.

10. A method of making a bimetallic planographic printing plate according to claim 7 wherein said second metal base sheet is copper.

11. A method of making a bimetallic planographic printing plate according to claim 7 wherein said second metal base sheet is copper and said first metal base sheet is aluminum.

12. A method of making a bimetallic planographic printing plate according to claim 7 which comprises coating said second metal base sheet with said first coat (A) and coating said first coat with said second coat (C).

13. A method of making a bimetallic planographic printing plate according to claim 7 which comprises coating said second metal base sheet with said first coat (A) and coating said first coat with said second coat (D).

14. A method of making a bimetallic planographic printing plate according to claim 7 which comprises coating said second metal base sheet with said first coat (B) and coating said first coat with said second coat (E).

15. A method of making a bimetallic planographic printing plate according to claim 7 which comprises coating said second metal base sheet with said first coat (B) and coating said first coat with said second coat (F).

References Cited

UNITED STATES PATENTS 3,130,048 4/1964 Fritz et al. ---------- 96—36.3

FOREIGN PATENTS 817,686 8/1959 Great Britain.

GEORGE F. LESMES, Primary Examiner

R. E. MARTIN, Assistant Examiner

U.S. Cl. X.R.

96—36.3, 75

PO-1050
(5/69)

UNITED STATES PATENT OFFICE
CERTIFICATE OF CORRECTION

Patent No. 3,479,182 Dated November 18, 1969

Inventor(s) Simon L. Chu

It is certified that error appears in the above-identified patent and that said Letters Patent are hereby corrected as shown below:

Col. 5, line 41, change "taned" to -- tanned --; Col 6, line 46, change "coatin" to -- coating --; Col. 10, in the "References Cited," before "Fritz" insert -- 3,085,008 4/63 Case 96-75 -- and after "Fritz" insert -- 3,287,128 11/66 Lugasch 96-33 --.

SIGNED AND
SEALED
MAY 19 1970

(SEAL)
Attest:

Edward M. Fletcher, Jr.
Attesting Officer

WILLIAM E. SCHUYLER, JR.
Commissioner of Patents